US011805101B2

(12) United States Patent
Sun et al.

(10) Patent No.: US 11,805,101 B2
(45) Date of Patent: Oct. 31, 2023

(54) SECURED SUPPRESSION OF ADDRESS DISCOVERY MESSAGES

(71) Applicant: VMware, Inc., Palo Alto, CA (US)

(72) Inventors: Li Sun, Sunnyvale, CA (US);
Parasuramji Rajendran, San Jose, CA (US); Yang Ping, San Jose, CA (US);
Jianjun Shen, Redwood City, CA (US)

(73) Assignee: VMWARE, INC., Palo Alto, CA (US)

( * ) Notice: Subject to any disclaimer, the term of this patent is extended or adjusted under 35 U.S.C. 154(b) by 219 days.

(21) Appl. No.: 17/223,731

(22) Filed: Apr. 6, 2021

(65) Prior Publication Data
US 2022/0321535 A1 Oct. 6, 2022

(51) Int. Cl.
H04L 9/40 (2022.01)
H04L 61/103 (2022.01)
H04L 101/622 (2022.01)

(52) U.S. Cl.
CPC ........ H04L 63/0263 (2013.01); H04L 61/103 (2013.01); H04L 63/0236 (2013.01); H04L 63/20 (2013.01); H04L 2101/622 (2022.05)

(58) Field of Classification Search
CPC .............. H04L 63/0263; H04L 61/103; H04L 63/0236; H04L 63/20; H04L 2101/622; H04L 61/58
USPC .......................................................... 726/11
See application file for complete search history.

(56) References Cited

U.S. PATENT DOCUMENTS 6,016,316 A    1/2000 Moura et al.
6,456,624 B1   9/2002 Eccles et al.
(Continued)

FOREIGN PATENT DOCUMENTS

CN    1937589 A  *  3/2007  ............. H04L 12/24
EP    2566129 A1    3/2013
(Continued)

OTHER PUBLICATIONS

Author Unknown, "Enabling Service Chaining on Cisco Nexus 1000V Series," Month Unknown, 2012, 25 pages, CISCO.
(Continued)

Primary Examiner — Abiy Getachew
Assistant Examiner — Aubrey H Wyszynski
(74) Attorney, Agent, or Firm — ADELI LLP

(57) ABSTRACT

Some embodiments provide a novel secure method for suppressing address discovery messaging. In some embodiments, the method receives an address discovery record that provides a network address associated with a machine connected to a network. The method then identifies a set of one or more rules for evaluating the received address discovery record to determine whether the address discovery record or its provided network address should be distributed to one or more hosts and/or devices associated with the network. The method then processes the set of rules to determine whether the received address discovery record violates a rule in the set of rules so as to prevent the distribution of its provided network address. When the address discovery record violates a rule, the method discards it in some embodiments. On the other hand, when the address discovery record does not violate any rule in the identified set of rules, the method distributes the address discovery record or its provided network address to one or more hosts and/or devices associated with the network.

20 Claims, 5 Drawing Sheets

(56) References Cited

U.S. PATENT DOCUMENTS

| | | | |
|---|---|---|---|
| 6,493,767 B1 | 12/2002 | Ishida et al. |
| 6,751,221 B1 | 6/2004 | Saito et al. |
| 6,862,264 B1 | 3/2005 | Moura et al. |
| 7,009,974 B1 | 3/2006 | Fotedar |
| 7,260,648 B2 | 8/2007 | Tingley et al. |
| 7,478,173 B1 | 1/2009 | Delco |
| 7,542,468 B1 | 6/2009 | Begley et al. |
| 7,660,287 B2 | 2/2010 | Axelsson et al. |
| 7,760,735 B1 | 7/2010 | Chen et al. |
| 7,802,000 B1 | 9/2010 | Huang et al. |
| 7,818,452 B2 | 10/2010 | Matthews et al. |
| 7,948,986 B1 | 5/2011 | Ghosh et al. |
| 8,190,767 B1 | 5/2012 | Maufer et al. |
| 8,614,820 B2 | 12/2013 | Kamei |
| 8,897,303 B2 | 11/2014 | Xiong et al. |
| 9,264,313 B1 | 2/2016 | Manuguri et al. |
| 9,319,336 B2 | 4/2016 | Thakkar et al. |
| 9,531,676 B2 | 12/2016 | Wang et al. |
| 9,548,965 B2 | 1/2017 | Wang et al. |
| 9,992,106 B2 | 6/2018 | Wang |
| 10,009,314 B2 * | 6/2018 | Shigeeda ............ H04L 61/5007 |
| 10,142,160 B1 | 11/2018 | Adams et al. |
| 10,505,891 B2 * | 12/2019 | Sreeramoju ......... H04L 63/0435 |
| 10,593,174 B1 | 3/2020 | Yoon |
| 10,637,778 B1 * | 4/2020 | Warfield ............... H04L 45/745 |
| 10,798,048 B2 | 10/2020 | Lim et al. |
| 2002/0013858 A1 | 1/2002 | Anderson |
| 2003/0026258 A1 | 2/2003 | Takatani et al. |
| 2003/0037163 A1 | 2/2003 | Kitada et al. |
| 2003/0093481 A1 | 5/2003 | Mitchell et al. |
| 2004/0054799 A1 | 3/2004 | Meier et al. |
| 2005/0080891 A1 | 4/2005 | Cauthron |
| 2005/0251856 A1 | 11/2005 | Araujo et al. |
| 2007/0061492 A1 | 3/2007 | Riel |
| 2007/0101323 A1 | 5/2007 | Foley et al. |
| 2007/0110068 A1 | 5/2007 | Sekiguchi et al. |
| 2007/0150341 A1 | 6/2007 | Zia et al. |
| 2007/0286209 A1 | 12/2007 | Wang et al. |
| 2008/0072305 A1 | 3/2008 | Casado et al. |
| 2008/0080512 A1 | 4/2008 | Gofman et al. |
| 2008/0151893 A1 | 6/2008 | Nordmark et al. |
| 2008/0189769 A1 | 8/2008 | Casado et al. |
| 2009/0025077 A1 | 1/2009 | Trojanowski |
| 2009/0028144 A1 | 1/2009 | Blair |
| 2009/0129271 A1 | 5/2009 | Ramankutty et al. |
| 2009/0235325 A1 | 9/2009 | Dimitrakos et al. |
| 2009/0249472 A1 | 10/2009 | Litvin et al. |
| 2010/0115080 A1 | 5/2010 | Kageyama |
| 2010/0141402 A1 | 6/2010 | Eun et al. |
| 2010/0318665 A1 | 12/2010 | Demmer et al. |
| 2011/0022695 A1 | 1/2011 | Dalal et al. |
| 2011/0107331 A1 | 5/2011 | Evans et al. |
| 2011/0142053 A1 | 6/2011 | Merwe et al. |
| 2011/0202920 A1 | 8/2011 | Takase |
| 2011/0246633 A1 | 10/2011 | Khosravi et al. |
| 2011/0264610 A1 | 10/2011 | Armstrong et al. |
| 2011/0299402 A1 | 12/2011 | Vobbilisetty et al. |
| 2011/0299537 A1 | 12/2011 | Saraiya et al. |
| 2011/0317703 A1 | 12/2011 | Dunbar et al. |
| 2011/0320821 A1 | 12/2011 | Alkhatib et al. |
| 2012/0014387 A1 | 1/2012 | Dunbar et al. |
| 2012/0158997 A1 | 6/2012 | Hsu et al. |
| 2012/0197973 A1 | 8/2012 | Tukol et al. |
| 2012/0307826 A1 | 12/2012 | Matsuoka |
| 2012/0323987 A1 | 12/2012 | Cantu et al. |
| 2013/0034097 A1 | 2/2013 | Dharmapurikar et al. |
| 2013/0044636 A1 | 2/2013 | Koponen et al. |
| 2013/0044754 A1 | 2/2013 | Zhu |
| 2013/0054761 A1 | 2/2013 | Kempf et al. |
| 2013/0060940 A1 | 3/2013 | Koponen et al. |
| 2013/0061047 A1 | 3/2013 | Sridharan et al. |
| 2013/0073743 A1 | 3/2013 | Ramasamy et al. |
| 2013/0148656 A1 | 6/2013 | Zhang et al. |
| 2013/0151676 A1 | 6/2013 | Thakkar et al. |
| 2013/0227550 A1 | 8/2013 | Weinstein et al. |
| 2013/0266015 A1 | 10/2013 | Qu et al. |
| 2013/0268930 A1 | 10/2013 | Saidi et al. |
| 2013/0308641 A1 | 11/2013 | Ackley |
| 2013/0322443 A1 | 12/2013 | Dunbar et al. |
| 2013/0332983 A1 | 12/2013 | Koorevaar et al. |
| 2014/0019639 A1 | 1/2014 | Ueno |
| 2014/0059544 A1 | 2/2014 | Koganty et al. |
| 2014/0068602 A1 | 3/2014 | Gember et al. |
| 2014/0092901 A1 | 4/2014 | Kapadia et al. |
| 2014/0115578 A1 | 4/2014 | Cooper et al. |
| 2014/0195666 A1 | 7/2014 | Dumitriu et al. |
| 2015/0003453 A1 | 1/2015 | Sengupta et al. |
| 2015/0016469 A1 | 1/2015 | Ganichev et al. |
| 2015/0032691 A1 | 1/2015 | Hall et al. |
| 2015/0043581 A1 | 2/2015 | Devireddy et al. |
| 2015/0052262 A1 | 2/2015 | Chanda et al. |
| 2015/0052522 A1 | 2/2015 | Chanda et al. |
| 2015/0058463 A1 | 2/2015 | Wang et al. |
| 2015/0058968 A1 | 2/2015 | Wang et al. |
| 2015/0103645 A1 | 4/2015 | Shen et al. |
| 2015/0103661 A1 | 4/2015 | Shen et al. |
| 2015/0103842 A1 | 4/2015 | Chandrashekhar et al. |
| 2015/0106489 A1 | 4/2015 | Duggirala |
| 2015/0172222 A1 | 6/2015 | Liao et al. |
| 2015/0180673 A1 | 6/2015 | Kuwata |
| 2015/0180824 A1 | 6/2015 | Atanasov |
| 2015/0215265 A1 | 7/2015 | Lim |
| 2015/0281180 A1 | 10/2015 | Raman et al. |
| 2015/0281274 A1 | 10/2015 | Masurekar et al. |
| 2015/0312118 A1 | 10/2015 | Behera et al. |
| 2015/0350043 A1 | 12/2015 | Kovács et al. |
| 2016/0057014 A1 | 2/2016 | Thakkar et al. |
| 2016/0127306 A1 | 5/2016 | Wang et al. |
| 2016/0173441 A1 | 6/2016 | Lee et al. |
| 2016/0197876 A1 | 7/2016 | Bui et al. |
| 2016/0226817 A1 | 8/2016 | Kang et al. |
| 2016/0248601 A1 | 8/2016 | Nomi |
| 2016/0301655 A1 | 10/2016 | Lim et al. |
| 2017/0093618 A1 | 3/2017 | Chanda et al. |
| 2018/0006969 A1 | 1/2018 | Venkateshaiah et al. |
| 2019/0036868 A1 | 1/2019 | Chandrashekhar et al. |
| 2019/0140944 A1 | 5/2019 | Tang et al. |
| 2019/0342258 A1 | 11/2019 | Raj et al. |
| 2021/0266255 A1 | 8/2021 | Ganapathy et al. |
| 2021/0314288 A1 | 10/2021 | Zhu et al. |
| 2022/0272110 A1 * | 8/2022 | Agrawal ................. H04L 63/10 |

FOREIGN PATENT DOCUMENTS

| | | |
|---|---|---|
| WO | 2008095010 A1 | 8/2008 |
| WO | 2012051884 A1 | 4/2012 |
| WO | 2012093429 A1 | 7/2012 |
| WO | 2015030882 A1 | 3/2015 |

OTHER PUBLICATIONS

Dumitriu, Dan Mihai, et al., (U.S. Appl. No. 61/514,990), filed Aug. 4, 2011, 31 pages.

Elmeleegy, Khaled, et al., "EtherProxy: Scaling Ethernet By Suppressing Broadcast Traffic," IEEE INFOCOM 2009, Apr. 19, 2009, 9 pages, IEEE.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Kim, Changhoon, et al., "Floodless in SEATTLE: A Scalable Ethernet Architecture for Large Enterprises," SIGCOMM'08, Aug. 17-22, 2008, 12 pages, ACM, Seattle, Washington, USA.

Mann, Vijay, et al., "Crossroads: Seamless VM Mobility Across Data Centers Through Software Defined Networking," IEEE Network Operations and Management Symposium (NOMS), Apr. 16-20, 2012, 9 pages, IEEE, Piscataway, NJ, USA.

(56) References Cited

OTHER PUBLICATIONS

Mysore, Radhka Niranjan, et al., "PortLand: A Scalable Fault-Tolerant Layer 2 Data Center Network Fabric," Proc. Of SIGCOMM, Aug. 17-21, 2009, 12 pages.

Narten, Thomas, et al., "Address Resolution Problems in Large Data Center Networks," Jan. 2013, 17 pages, Internet Engineering Task Force (IETF).

Non-Published commonly owned U.S. Appl. No. 16/906,703, filed Jun. 19, 2020, 25 pages, VMware, Inc.

Plummer, David, "An Ethernet Address Resolution Protocol or Converting Network Protocol Addresses to 48.bit Ethernet Address for Transmission on Ethernet Hardware," RFC 826, Nov. 1982, 10 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Shah, Himanshu, et al., "ARP Broadcast Reduction for Large Data Centers," draft-shah-armd-arp- reduction-02.txt, Oct. 28, 2011, 11 pages, IETF Trust.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

\* cited by examiner

SECURED SUPPRESSION OF ADDRESS DISCOVERY MESSAGES

BACKGROUND

Address Resolution Protocol (ARP) and Neighbor Discovery (ND) messaging are methodologies used in IPv4 and IPv6 respectively to identify network addresses (e.g., media access control (MAC) addresses) associated with other network addresses (e.g., Internet Protocol (IP) addresses). This messaging is referred to below generically as address discovery messaging. ARP and ND messages can place undue burden on a network if they are not intelligently suppressed. Today, several ARP and ND suppression techniques are used to reduce the amount of ARP broadcast flooding within individual VXLAN segments that connect virtual machines (VMs).

In one existing design, when a first VM wants to know the MAC address for a second VM, it sends an ARP request. This ARP request can be intercepted by a software switch executing on the same host and implementing a logical switch with several other software switches executing on several other hosts. When the logical switch already has an ARP entry for the target, it sends the ARP response to the VM. If not, it sends an ARP query to a network controller. When the controller knows VM IP to MAC binding, the controller replies with the binding and the logical switch sends the ARP response. When the controller does not have the ARP entry, then the ARP request is re-broadcasted on the logical switch.

Although ARP suppression results could effectively reduce broadcasting traffic on a data path, the above-described design has potential security issues. The unexpected ARP suppression behaviors may include unused ARP record not expiring in time, a VM adding unlimited number of bindings, and a compromised VM replacing the binding of another VM's IP-to-MAC mapping. Traditionally, network operators need to monitor these issues and react passively.

SUMMARY

Some embodiments provide a novel secure method for suppressing address discovery messaging. The method of some embodiments is implemented on a cluster of one or more network controllers. In some embodiments, the method receives an address discovery record that provides a network address associated with a machine connected to a network (e.g., a message providing a MAC address for an IP address of a VM or container connected to a logical network). The address discovery record in some embodiments is received from a host computer that associates two network addresses (e.g., an IP address and a MAC address of a machine executing on the host computer) through address discovery snooping (e.g., ARP snooping), DHCP snooping, or machine tools.

The method then identifies a set of one or more rules for evaluating the received address discovery record to determine whether the address discovery record or its provided network address should be distributed to one or more hosts and/or devices associated with the network (e.g., to hosts executing other VMs or containers connected to the logical network). In some embodiments, the set of rules are user-defined rules specified by an administrator for the network and/or by the pre-configured rules specified by the application developer of the network controller.

The method then processes the set of rules to determine whether the received address discovery record violates a rule in the set of rules so as to prevent the distribution of its provided network address. When the address discovery record violates a rule, the method discards it in some embodiments. On the other hand, when the address discovery record does not violate any rule in the identified set of rules, the method distributes the address discovery record or its provided network address to one or more hosts and/or devices associated with the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel secure method for suppressing address discovery messaging. The method of some embodiments is implemented on a cluster of one or more network controllers. In some embodiments, the method receives an address discovery record that provides a network address associated with a machine connected to a network (e.g., a message providing a MAC address for an IP address of a VM or container connected to a logical network). The method then identifies a set of one or more rules for evaluating the received address discovery record to determine whether the address discovery record or its provided network address should be distributed to one or more hosts and/or devices associated with the network (e.g., to hosts executing other VMs or containers connected to the logical network).

The method then processes the set of rules to determine whether the received address discovery record violates a rule in the set of rules so as to prevent the distribution of its provided network address. When the address discovery record violates a rule, the method discards it in some embodiments. On the other hand, when the address discovery record does not violate any rule in the identified set of rules, the method distributes the address discovery record or its provided network address to one or more hosts and/or devices associated with the network.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 1:
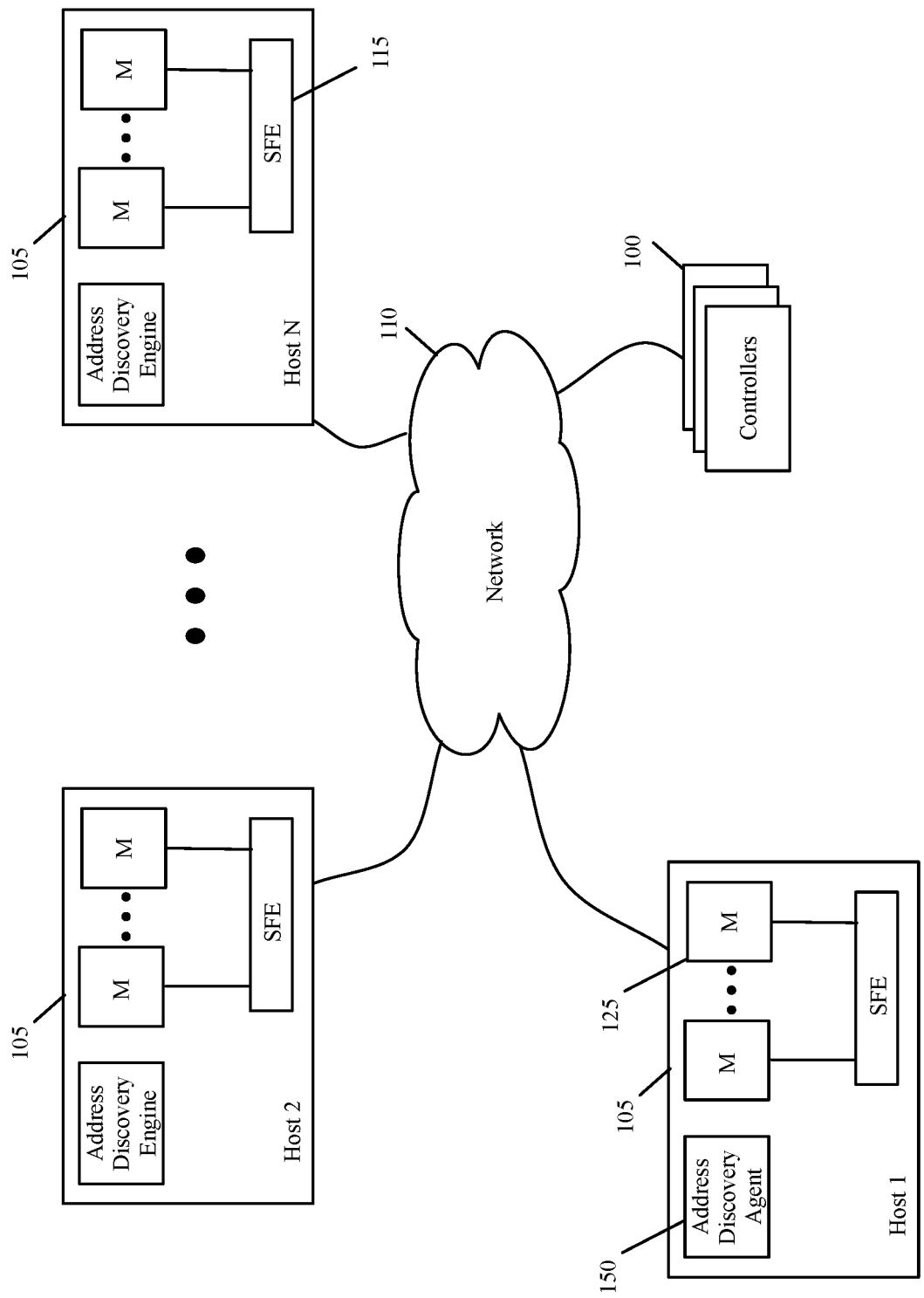
FIG. 1 illustrates a system that implements some embodiments of the invention.

The method of some embodiments is implemented by a cluster of one or more network controllers illustrated in FIG. 1. As shown, the network controller cluster 100 communicates with several host computers 105 in a datacenter through an intervening network 110. The network controller cluster 100 in some embodiments provides configuration data to configure software forwarding elements 115 executing on these host computers to implement one or more logical forwarding elements, with each logical forwarding element spanning multiple host computers to connect machines 125 (e.g., VMs or containers) executing on these host computers. One example of a logical forwarding element is a logical switch that spans multiple hosts 105 and that is implemented by configuring multiple software switches executing on those hosts. Another example is a logical router implemented by multiple software routing instances executing on multiple hosts.

In some embodiments, each host computer 105 executes multiple machines 125 (e.g., VMs) and an IP Discovery (IP-D) agent 150 that can discover the IP and MAC addresses for the machines executing on the host computer. Also, each host in some embodiments executes a hypervisor (e.g., ESXi of VMware) that supports multiple different IP Discovery methods, such as ARP snooping, DHCP snooping, and VM tools snooping. Each host reports its discovered IP and MAC addresses to the network controller cluster 100.

In some embodiments, discovered IP and MAC addresses are grouped based on virtual interfaces (VIFs) of the machines (e.g., VMs). Depending on user configurations, one VM can have multiple VIFs in some embodiments. Also, the same IP-MAC address mapping can be discovered through different methods, e.g., IP1 and MAC1 can be discovered through both ARP snooping and VM tools snooping. In some embodiments, a host computer reports separately the same IP-MAC address mapping that is discovered through different methods. Each report in some embodiments is part of an address discovery record that the host computer provides to the network controller cluster.

A VIF is associated with (conceptually "plugged" into) a logical switch port (LSP). There is a 1-to-1 mapping relationship between VIF and LSP in some embodiments. In some embodiments, a host computer reports discovered bindings to the controller cluster 100 based on VIFs. One VIF discovered binding in some embodiments includes all IP and MAC addresses configured on the VIF. The same IP and MAC address can be discovered by different methods and will be reported separately, as mentioned above. Also, in some embodiments, not all discovery methods find the same IP and MAC addresses at the same time. For instance, ARP snooping only works when data message traffic is passing through the network, while VM tools work in a more static way to find IP and MAC addresses based on the hypervisor's privilege to monitor VM.

In some embodiments, an LSP belongs to logical switch (LS). One logical switch can have multiple LSPs, so the relationship between LS and LSP is 1-to-n. The controller cluster in some embodiments associates VIF discovered bindings with the LSP through LSP-VIF relationship. The network controller in some embodiments computes the valid ARP on LSP based on host reported VIF discovered bindings and the IP discovery profile (specified by the network administrator and/or application developer of the network controller). The IP discovery profile is specified in the LSP configuration in some embodiments, while it is specified in the LS configuration in other embodiments.

The network controller cluster 100 in some embodiments groups LSP address discovery records per logical switch. As one logical switch has multiple logical ports and each logical port can have multiple address discover records, the controller cluster 100 in some embodiments checks duplicated and conflicting address discovery records on different logical ports of the same logical switch. The network controller cluster 100 also publishes to all the host computers 105 the address discovery records that do not violate the address-discovery processing rules specified in the IP discovery profile specified by the network administrator and/or by the application developer of the network controller.

Figure 2:
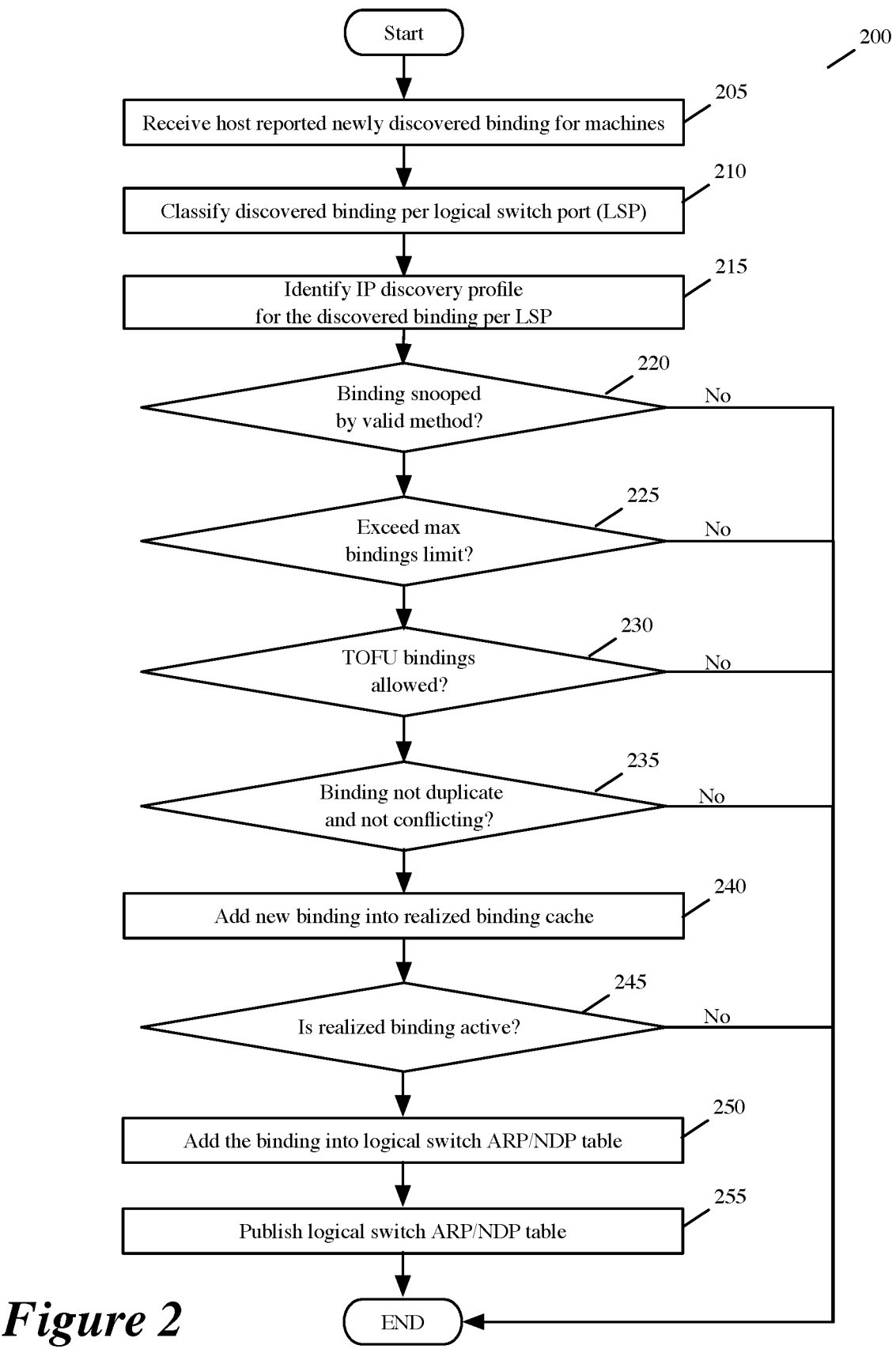
FIG. 2 illustrates a process the network controller cluster of FIG. 1 performs to implement the method of some embodiments.
Figure 3:
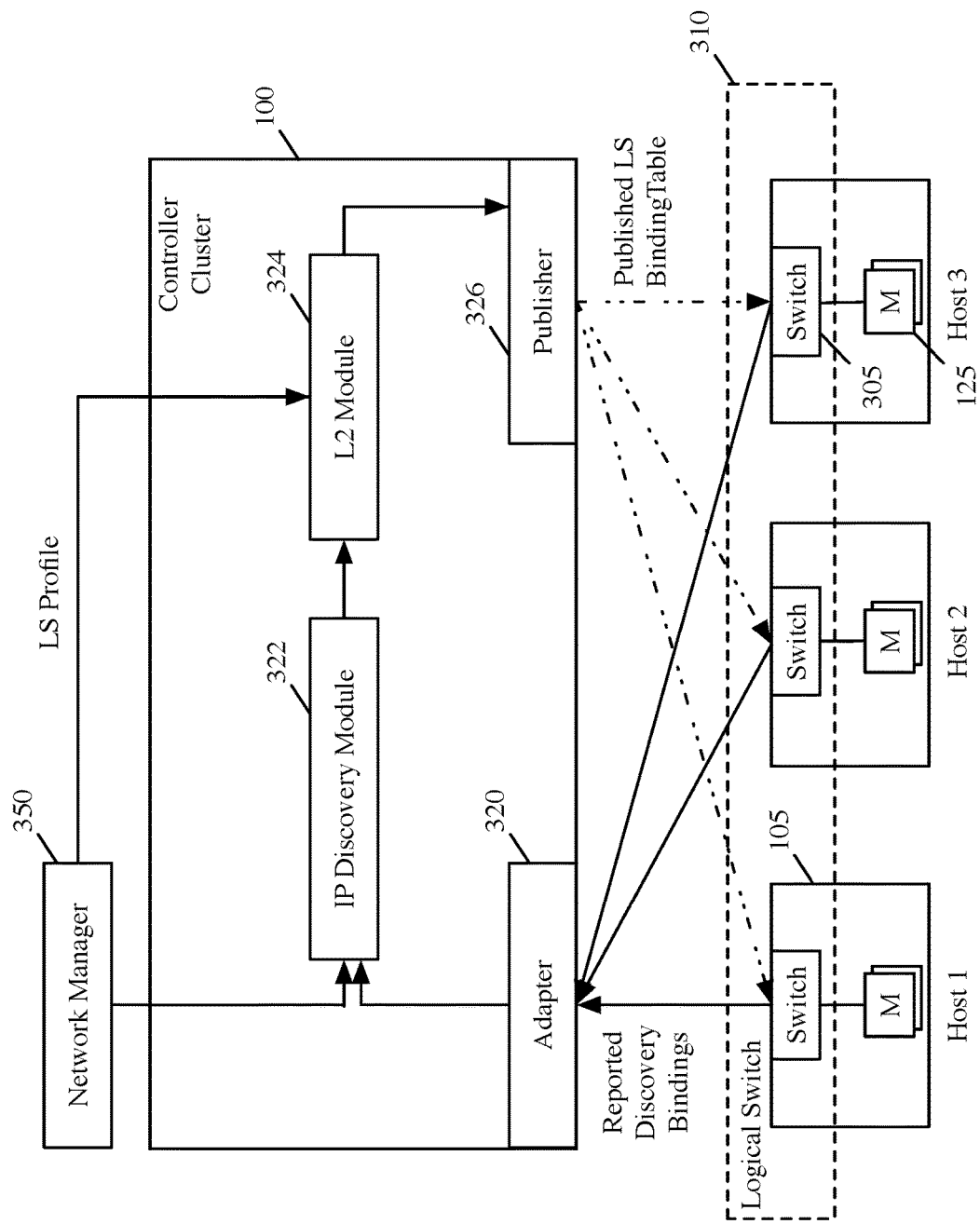
FIG. 3 illustrates a more detailed view of the components of the network controller cluster of some embodiments.

FIG. 2 illustrates a process 200 the network controller cluster 100 performs to implement the method of some embodiments. This process will be described by reference to FIG. 3, which illustrates a more detailed view of the components of the network controller cluster 100. In some embodiments, these components operate (e.g., execute) on one appliance or computer, while in other embodiments, these components operate two or more different appliances or computers. FIG. 3 also illustrates three host computers 105 that execute three software switches 305 that implement one logical switch 310 that logically connects several machines 125 that are part of one logical segment of a logical network.

As shown, the process 200 starts (at 205) when a host computer 105 reports a discovered network address binding (e.g., an IP-MAC binding associating an IP address with a MAC address) for a machine executing on the host computer. In some embodiments, a host computer executes a discovery agent that uses one or more techniques (such as ARP snooping, DHCP snooping, machine tools, etc.) to identify and associate network addresses (e.g., to identify machine MAC addresses and associate them with machine IP addresses) for machines (e.g., VMs) executing on the host computer.

FIG. 3 illustrates an adapter 320 of the controller cluster 100 receiving discovery bindings from the host computer 105. In some embodiments, a host computer provides to the network controller cluster 100 a report of one or more discovery bindings periodically or based on report triggering events. In some embodiments, each reported discovery binding not only specifies an associated pair of IP-MAC addresses but also specifies a method by which the binding was learned (e.g., by which method the MAC address was learned for the IP address).

At 210, the process 200 classifies the reported discovered binding, i.e., identifies the logical port associated with the discovered binding. In some embodiments, the adapter 320 identifies the logical port for the reported binding, while in other embodiments the IP discovery module 322 identifies the logical port for this binding. Either of these modules in some embodiments identifies the logical port for the binding by using the reported IP address of the discovered binding as an index into a look-up table that identifies each logical port associated with each of several IP addresses. As shown in FIG. 3, the IP discovery module 322 receives the IP-discovery profiles for the logical switch ports from a cluster of network managers 350.

Next, at 215, the IP discovery module 322 identifies the IP discovery profile for the discovered binding by identifying the IP discovery profile specified for the logical switch port identified for the binding at 210. In some embodiments, the IP discovery profile for a logical switch or a logical port of the logical switch is specified by a network administrator and/or by the application developer of the network controllers.

At 220, the IP discovery module 322 determines whether the reported binding was learned by a valid method. This module makes this determination in some embodiments by examining the IP discovery profile identified at 215 to identify one or more learning methods that the profile specifies as valid for learning network addresses for the logical port identified at 210. This module then determines whether the identified valid learning methods include the learning method that was reported for the received binding by the host computer that provided the binding record.

One example of an IP discovery profile being used at 220 is as follows. The network administrator may only wish to accept IP-MAC bindings for a logical switch that are discovered through ARP snooping. The network manager captures this use intent and expresses it in the IP-discovery profile for each logical port of the logical switch. For such a profile, the IP discovery module would determine that a discovered binding that was learned on a host computer through DHCP snooping is not a binding that was learned through a valid snooping method.

When the IP discovery module 322 determines (at 220) that the discovered binding was not learned on a host computer through a learning method that is specified as valid for the logical port associated with the binding, the IP discovery module 322 discards (at 220) the binding and then the process 200 ends. Otherwise, at 225, the IP discovery module 322 determines whether the reported binding (received at 205) exceeds the maximum number of bindings that can be reported for the logical switch port identified at 210.

For example, the identified LSP's IP discovery profile might only allow 1 ARP snooped record on an LSP. For such a case, the IP discovery module 322 would discard a discovery binding that is the second ARP-snooped reported record when the first ARP-snooped reported record has not expired or been removed. In other embodiments, the maximum number of reported bindings is a parameter that is associated with a time period, e.g., it specifies that no more than 1 snooped ARP record can be provided for an LSP every hour or every day.

When the IP discovery module 322 determines (at 225) that the reported binding exceeds the maximum number of bindings that can be reported for the logical switch port identified at 210, the IP discovery module 322 discards the binding and then the process 200 ends. Otherwise, at 230, the IP discovery module 322 determines whether the identified IP discovery profile includes any TOFU (Trust-On-First-Use) rule and if so, the reported binding violates this rule. A TOFU rule in some embodiments specifies that the network controller cluster 100 can only accept the first few reported bindings on an LSP.

Suppose a user configures TOFU capacity as 1 on LSP1. A host reports a first binding (IP1, MAC1) for LSP1 on one day, and the network controller cluster accepts this binding as a valid ARP record. On another day, the host reports another binding (IP2, MAC2) for LSP1, but the network controller will not accept this binding as a valid ARP record until the first binding (IP1, MAC1) is removed by the host. In some embodiments, the TOFU parameter has an associated time component that allows the parameter to be reset every hour, number of hours, days, etc.

When the IP discovery module 322 determines (at 230) that the identified IP discovery profile does not specify any TOFU rule, or it does but the reported binding does not violate the specified rule, the IP discovery module 322 discards (at 235) the binding, and then the process 200 ends. Otherwise, at 235, the IP discovery module 322 determines whether the reported binding is a duplicate of an earlier reported binding or conflicts with an earlier reported binding. For instance, the reported binding might match another binding already created and stored at the logical switch level. In such a case, the network controller will not create another record for the newly reported binding. The network controller will also not create a binding record for the newly reported binding (IP1, MAC1) when this binding conflicts an earlier created binding record (IP1, MAC2) for the same IP address.

To perform its operations at 235, the IP discovery module 322 compares the binding record received at 205 with the binding table that the network controller cluster 100 maintains. In some embodiments, this binding table stores multiple records of associated IP-MAC addresses, with each record providing a MAC address for an IP address of a machine or device that is connected to the logical network that the network controller cluster configures on shared network infrastructure of a datacenter.

When the IP discovery module 322 determines (at 235) that the reported binding is not a duplicate of an earlier reported binding nor conflicts with an earlier reported binding, the IP discovery module 322 creates (at 240) a new binding record into its realized binding cache for the logical network, and then transitions to 245. In some embodiments, the cache in the IP Discovery module is per logical switch port. Each LSP has its own cache. The LSP cache holds the bindings that are considered as "realized" from IP Discovery perspective.

The network controller cluster 100 maintains another cache as well, which is the cache in L2 module 324. This cache is per logical switch (LS). LS cache holds the bindings that can be added into L2 ARP table. A binding that can be added into L2 ARP table must be "active" from L2 perspective. By doing so, the network controller cluster 100 of some embodiments separates the standard of "realized" binding from "active" binding. In some embodiments, realized binding standard is configured in a LogSwtichPortConfigMsg that is per LSP, and consumed by IP Discovery module 322, and active binding standard is configured in LogSwitchConfigMsg that is per LS and consumed by L2).

For example, a user configures the VM tools discovered bindings on LSP1 as realized bindings (in IP Discovery module 322) and further configures the ARP snooped bindings in LS1 (LSP1 belongs to LS1) as active bindings (in L2 module 324). Suppose the host initially only reports a binding of (IP1, MAC1), which is discovered by VM tools on LSP1 to network controller cluster 100. The network controller cluster treats the binding as realized (in LSP cache) but will not add the binding into L2 ARP table (in LS cache) because it is not active. After some time, the binding (IP1, MAC1) is used by VM in network traffic, then the binding (IP1, MAC1) will be discovered by ARP snooping and the host will report the binding (IP1, MAC1) as ARP snooped binding to the network controller cluster. Then the network controller cluster adds (IP1, MAC1) into LS1's ARP table.

In another example, the user configures ARP-discovered bindings as both realized bindings (on LSP1) and active bindings (on LS1 with LSP1 belonging to LS1). Suppose that a first host initially reports the bindings (IP1, MAC1) discovered by ARP snooping on LSP1 to the network controller cluster 100. This cluster treats the bindings as realized (in IP Discovery module 322) and active (in L2 module 324). The binding (IP1, MAC1) is added into LS1's ARP table. Later on, a second host reports the binding (IP1, MAC2) discovered by ARP snooping on LSP2 to the network controller cluster 100. Assume LSP2 also belong to LS1. Now the binding (IP1, MAC2) conflicts with the binding (IP1, MAC1). The IP Discovery module 322 will do a LS level check for duplicated bindings and will not allow the binding (IP1, MAC2) to get realized. The L2 module 324 will not be aware of the second host's update in this procedure.

The IP Discovery module 322 operations relate to the realization of bindings, while the L2 module operations relate to the activeness of the bindings. They are designed to be in that way so that each module can focus on what it should do. But as the L2 module 324 is chained together with the IP Discovery module 322, a binding which can be eventually added into the L2 ARP table is actually both realized and active. The rationale of separating realization from activeness is, IP Discovery module is a foundation layer; it does not only serve the L2 module 342 but also serves the other modules of the network controller cluster 100 (e.g., middlebox service modules). By doing that, some embodiments maintain a flexible way to configure multiple verticals separately. Because of this, the architecture of some embodiments can easily add any new binding discovery method in the future.

At 245, the logical L2 module 324 determines whether the reported binding is active. If not, the process 200 ends. When the reported binding is active, the logical L2 module 324 of the network controller cluster 100 adds (at 250) the reported binding (received at 205) to the binding table of the logical switch to which the identified logical port belongs.

Next, at 255, a publisher 326 of the network controller cluster 100 publishes the updated binding table to the host computers 105 on which the logical switch 305 is implemented. In some embodiments, the publisher periodically publishes the binding table to the host computers and/or devices, while in other embodiments the publisher publishes the binding table to the host computers and/or devices based on triggering events (e.g., the updating of the table with one new binding record, or N new binding records where N is greater than 1). Also, in some embodiments, the publisher 326 publishes the binding table for the logical switch to all the host computers and/or devices that implement the logical network to which the logical switch belongs. After 255, the process ends.

Figure 4:
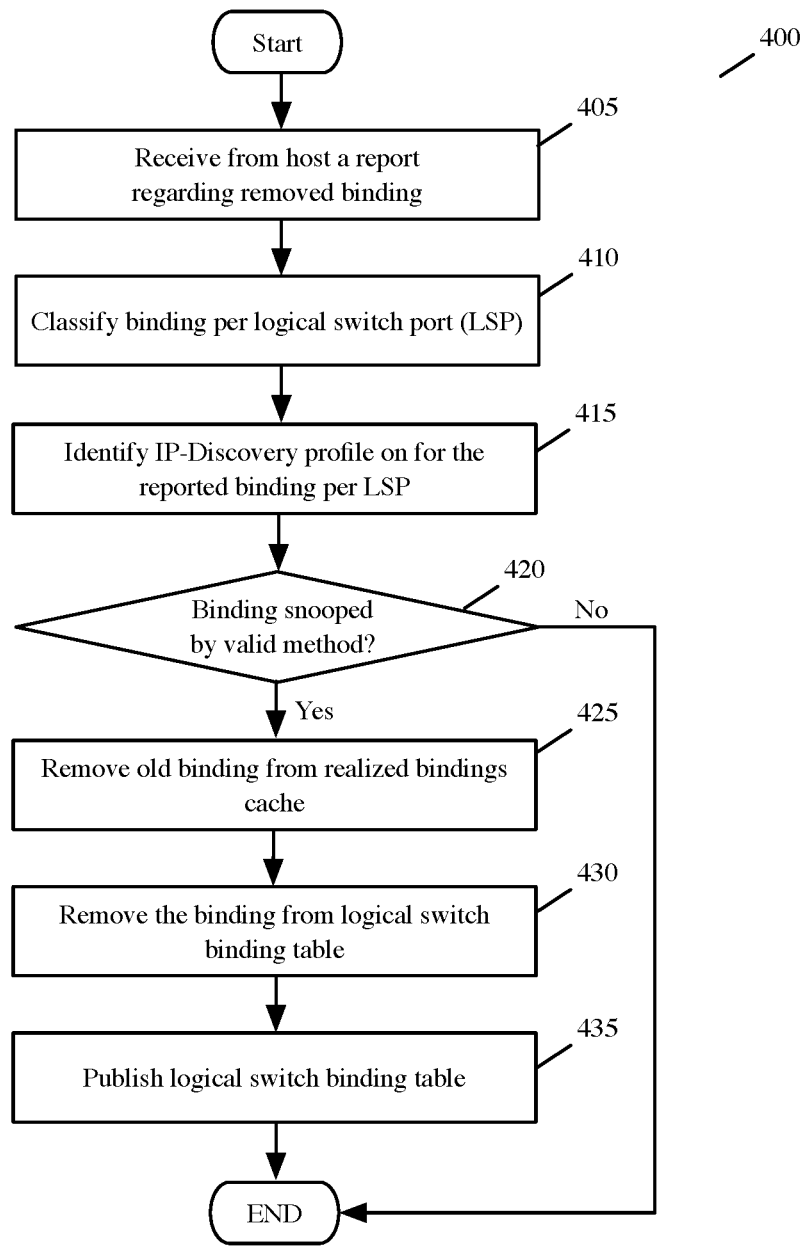
FIG. 4 illustrates a process the network controller cluster performs in some embodiments to remove a binding from a LS binding table based on a binding removal detected by a host computer.

FIG. 4 illustrates a process 400 the network controller cluster 100 performs in some embodiments to remove a binding from a LS binding table based on a binding removal detected by a host computer 105. As shown, the process 400 starts (at 405) when a host computer 105 reports the removal of a network address binding (e.g., an IP-MAC binding associating an IP address with a MAC address) on a host computer. In the example illustrated in FIG. 3, the adapter 320 of the controller cluster 100 receives the discovery binding removal from a host computer.

In some embodiments, when a host is shut down, it would report removed discovered bindings to the network controller cluster first. Other cases of discovered bindings being removed include (1) when an ARP snooped binding has not been involved in any network traffic for some time (e.g., 5 minutes), the host will remove the ARP snooped binding from the network controller cluster (note VM tools snooped binding can still be there in some embodiments as VM tools work in a completely different way from what ARP snooping does), and (2) a DHCP snooped binding can be removed by DHCP server, but it will not affect ARP snooped binding or VM tools snooped binding.

At 410, the process 400 classifies the reported binding that has been removed, i.e., identifies the logical port associated with this binding. In some embodiments, the adapter 320 identifies the logical port for the reported binding, while in other embodiments the IP discovery module 322 identifies the logical port for this binding. Either of these modules in some embodiments identifies the logical port for the binding by using the reported IP address of the removed binding as an index into a look-up table that identifies each logical port associated with each of several IP addresses.

Next, at 415, the IP discovery module 322 identifies the IP discovery profile for the removed binding by identifying the IP discovery profile specified for the logical switch port identified at 410. At 420, the IP discovery module 322 determines whether the reported binding was learned by a valid method. This module makes this determination in some embodiments by examining the IP discovery profile identified at 415 to identify one or more learning methods that the profile specifies as valid for learning network addresses for the logical port identified at 410. This module then determines whether the identified valid learning methods include the learning method that was reported for the received binding by the host computer that provided the binding record.

One example of an IP discovery profile being used at 420 is as follows. The network administrator may only wish to accept removed through ARP snooping because ARP records typically expire on a host quickly (e.g., after the network traffic on an IP address is not active anymore). In such a case, a host reports the removed ARP record to the network controller cluster 100, which then removes the ARP record from binding table for the logical switch.

When the IP discovery module 322 determines (at 420) that the removed binding was not learned on a host computer through a learning method that is specified as valid for the logical port associated with the binding, the IP discovery module 322 discards (at 420) the binding removal report and then the process 400 ends. Otherwise, the IP discovery module 322 removes (at 425) the binding record from its realized binding cache. Next, at 430, the logical L2 module 324 of the network controller cluster 100 removes the reported binding (received at 405) from the binding table of the logical switch to which the identified logical port belongs.

At 435, the publisher 326 of the network controller cluster 100 publishes the updated binding table to the host computers 105 on which the logical switch is implemented. In some embodiments, the publisher periodically publishes the binding table to the host computers and/or devices, while in other embodiments the publisher publishes the binding table to the host computers and/or devices based on triggering events (e.g., the updating of the table with one new binding records, or N new binding records where N is greater than 1). Also, in some embodiments, the publisher 326 publishes the binding table for the logical switch to all the host computers and/or devices that implement the logical network to which the logical switch belongs. After 435, the process ends.

The above-described processes provide a secured address discovery message suppression methodology for logical segments. These processes apply user intent in their suppression operations. These embodiments choose IP discovery profile to represent user's intent, as IP discovery profile is a common configuration used in many network services, such as distributed firewall, spoof guard, load balancing, etc. These embodiments compute their suppression table on the network controller. When doing so, these embodiments associate the host reported discovered bindings for a machine with the IP discovery profile configured on the machine's associated logical switch port and then enforce the IP discovery profile in the suppression computation.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

Figure 5:
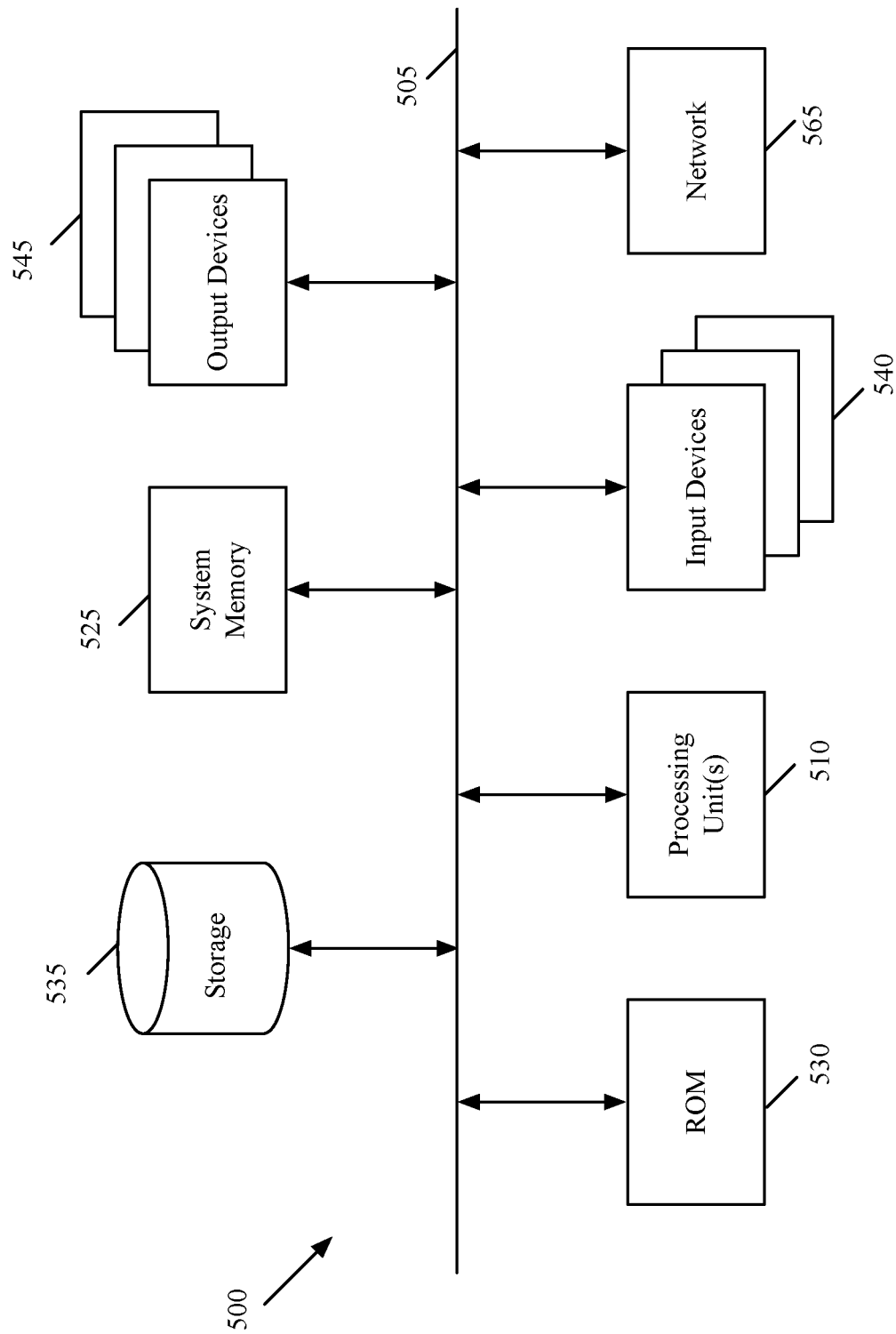
FIG. 5 conceptually illustrates a computer system with which some embodiments of the invention are implemented.

FIG. 5 conceptually illustrates a computer system 500 with which some embodiments of the invention are implemented. The computer system 500 can be used to implement any of the above-described hosts, controllers, and managers. As such, it can be used to execute any of the above described processes. This computer system includes various types of non-transitory machine readable media and interfaces for various other types of machine readable media. Computer system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the computer system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments. The read-only-memory (ROM) 530 stores static data and instructions that are needed by the processing unit(s) 510 and other modules of the computer system. The permanent storage device 535, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such as random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select requests to the computer system. The input devices 540 include alphanumeric keyboards and pointing devices (also called "cursor control devices"). The output devices 545 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 5, bus 505 also couples computer system 500 to a network 565 through a network adapter (not shown). In this manner, the computer can be a part of a network of computers (such as a local area network ("LAN"), a wide area network ("WAN"), or an Intranet), or a network of networks (such as the Internet). Any or all components of computer system 500 may be used in conjunction with the invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for suppressing address discovery messages in a network, the method comprising:
at a set of one or more servers:
receiving an address discovery record that binds a newly identified first network address of a machine connected to the network to a previously known second network address of the machine;
identifying a set of one or more rules for evaluating the received address discovery record to determine whether the received address discovery record should be distributed to one or more devices associated with the network;
processing the set of rules to determine whether the received address discovery record violates any rule in the set of rules so as to prevent the distribution of the received address discovery record;
when the received address discovery record does not violate any rule, distributing the received address discovery record to one or more devices associated with the network.

2. The method of claim 1 further comprising discarding the address discovery record when the address discovery record violate a rule in the identified set of rules.

3. The method of claim 1, wherein the address discovery record is an address resolution protocol (ARP) record.

4. The method of claim 1, wherein the address discovery record is a neighbor discovery (ND) record.

5. The method of claim 1, wherein the address discovery record binds the newly identified first network address and the previously known second network address through an address discovery snooping method on a device connected to the network.

6. The method of claim 5, wherein the device is a host computer on which machines connected to the network execute.

7. The method of claim 6, wherein receiving the address discovery record comprises receiving the address discovery record from the host computer.

8. The method of claim 5, wherein the newly identified first network address comprises a MAC (media access control) address and the previously known second network address comprises an IP (Internet Protocol) address.

9. The method of claim 1, wherein the set of rules comprises at least one user-defined rule specified by an administrator for the network.

10. The method of claim 1, wherein the set of rules comprises a rule that specifies a valid method for identifying the newly identified first network address, and receiving the address discovery record comprises receiving the address discovery record with an identifier that identifies the method by which the newly identified first network address was learned by a device that produced the address discovery record.

11. The method of claim 1, wherein the received address discovery record is for a port of a forwarding element of the network and the set of rules comprises a rule that specifies a maximum number of reported address discovery records for the port.

12. The method of claim 11, wherein the network is a logical network and the forwarding element is a logical forwarding element that spans a plurality of host computers associated with the logical network.

13. The method of claim 1, wherein the received address discovery record is for a port of a forwarding element of the network, and the set of rules comprises a trust-on-first-use rule that specifies a number of acceptable reported address discovery records for the port.

14. The method of claim 1, wherein the received address discovery record is for a port of a forwarding element of the network, and the set of rules comprises a rule that discards duplicate address discovery records that are reported for the port.

15. The method of claim 1, wherein the received address discovery record is for a port of a forwarding element of the network, and the set of rules comprises a rule that, after a first address discovery record is received for the port, discards a second address discovery record that is reported for the port.

16. The method of claim 1, wherein the devices to which the received address discovery record is distributed are host computers executing machines connected to the network.

17. The method of claim 1, wherein distributing the received address discovery record comprises distributing the address discovery record to the one or more devices.

18. The method of claim 1, wherein the set of servers comprises a set of one or more network controllers for configuring forwarding elements in the network.

19. A non-transitory machine readable medium storing a program for execution by at least one processing unit, the program for suppressing address discovery messages in a network, the program comprising sets of instructions for:
receiving an address discovery binding record that associates two network addresses of a machine connected to the network;
identifying a set of one or more rules for evaluating the received address discovery binding record to determine whether the received address discovery binding record should be distributed to one or more devices associated with the network;

processing the set of rules to determine whether the received address discovery binding record violates any rule in the set of rules so as to prevent the distribution of the received address discovery binding record;

when the address discovery binding record does not violate any rule, distributing the received address discovery binding record to one or more devices associated with the network; and discarding the received address discovery binding record when the address discovery binding record violates a rule in the identified set of rules.

20. The non-transitory machine readable medium of claim 19, wherein the program is a network controller program.

* * * * *